(12) United States Patent
Yada

(10) Patent No.: US 12,155,663 B2
(45) Date of Patent: Nov. 26, 2024

(54) MANAGEMENT PROGRAM, INFORMATION PROCESSING DEVICE, AND MANAGEMENT METHOD

(71) Applicant: BROTHER KOGYO KABUSHIKI KAISHA, Nagoya (JP)

(72) Inventor: Yuki Yada, Kuwana (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 324 days.

(21) Appl. No.: 17/586,789

(22) Filed: Jan. 28, 2022

(65) Prior Publication Data

US 2022/0247749 A1 Aug. 4, 2022

(30) Foreign Application Priority Data

Jan. 29, 2021 (JP) .................................. 2021-013365

(51) Int. Cl.
*H04L 9/40* (2022.01)
*H04L 41/12* (2022.01)
(52) U.S. Cl.
CPC ............ *H04L 63/101* (2013.01); *H04L 41/12* (2013.01); *H04L 63/102* (2013.01)
(58) Field of Classification Search
CPC ..... H04L 63/101; H04L 41/12; H04L 63/102; H04L 41/0853; H04L 41/046; H04L 41/0213; H04L 41/22
See application file for complete search history.

(56) References Cited

U.S. PATENT DOCUMENTS

| 8,189,225 | B1 * | 5/2012 | Lo ......................... | G06F 3/1292 |
| | | | | 358/1.15 |
| 2015/0363563 | A1 * | 12/2015 | Hallwachs ............. | G16H 40/67 |
| | | | | 705/3 |
| 2019/0107548 | A1 * | 4/2019 | Bohnsack ............ | G06Q 10/087 |

FOREIGN PATENT DOCUMENTS

CN 109819527 B * 1/2023
JP H11-296457 A 10/1999

* cited by examiner

*Primary Examiner* — S M A Rahman
(74) *Attorney, Agent, or Firm* — KENEALY VAIDYA LLP

(57) ABSTRACT

A non-transitory computer readable medium storing management program executable by a computer provided in an information processing device. The management program causes the computer to execute a process which includes determining whether a cloud access function is enabled in a terminal device, setting the terminal device as a management target in a case where it is determined that the cloud access function is not enabled in the determining; and performing at least one of acquiring terminal data that is included in the management target from the management target and writing the acquired terminal data into the cloud storage, or reading processing request data that is written into the cloud storage and indicates a processing to be executed by the management target from the cloud storage and causing the management target to execute the processing indicated by the processing request data.

8 Claims, 7 Drawing Sheets

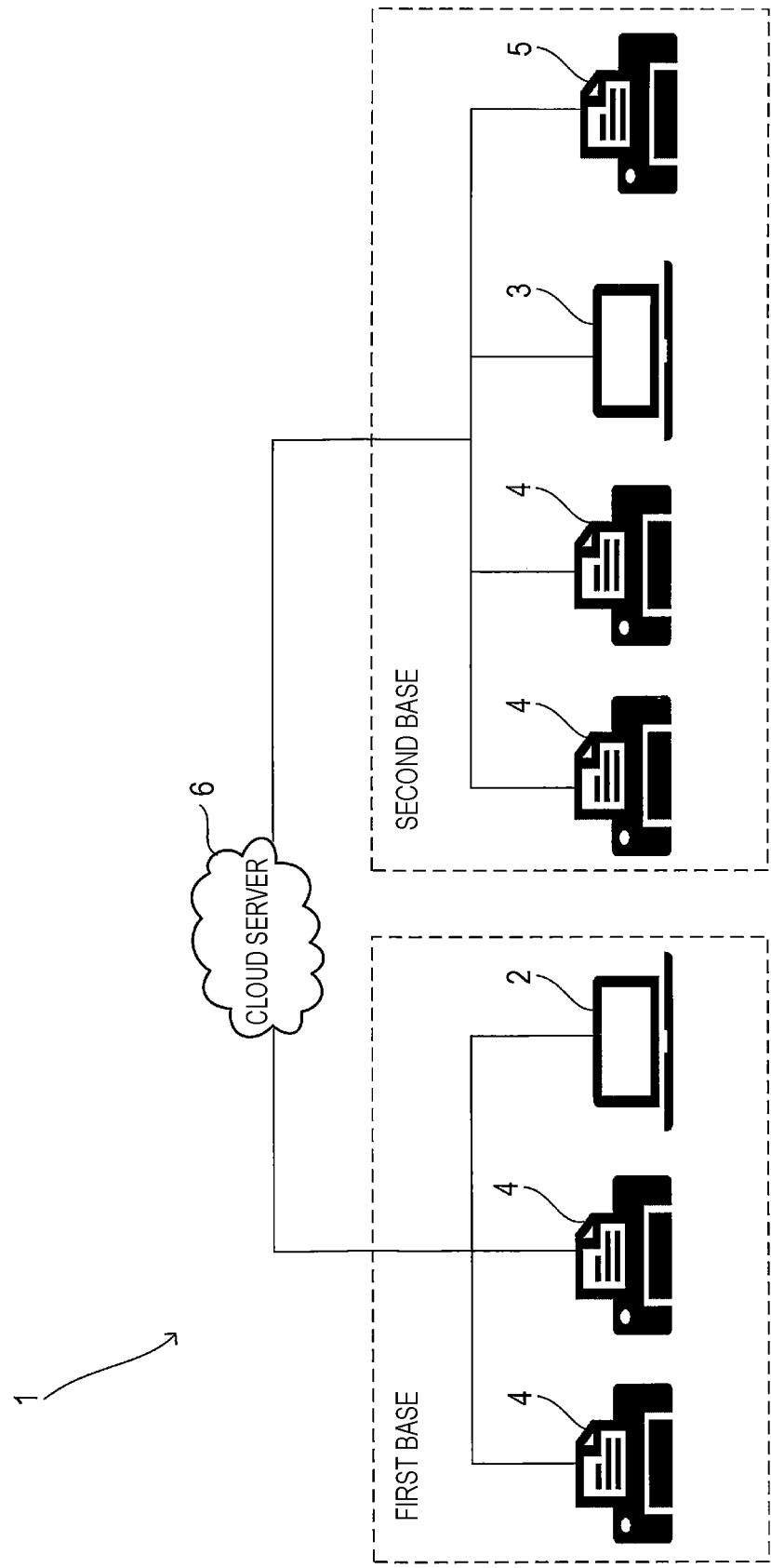

SCHEDULED TASK TABLE (RESULT)

| PROPERTY | FIRST KEY | SECOND KEY | REQUEST PARAMETER | RESPONSE PARAMETER | NOTIFICATION SOURCE | PROGRESS STATUS | DEVICE ID |
|---|---|---|---|---|---|---|---|
| VALUE | LOG | [DEVICE ID] | | [PROCESSING RESULT: OID/VALUE]* | DEVICE OR CLIENT | | |
| | STATUS | [DEVICE ID] | | [PROCESSING RESULT: OID/VALUE] | DEVICE OR CLIENT | | |
| | REGISTRATION | [DEVICE ID] | | [PROCESSING RESULT: OID/VALUE] | DEVICE OR CLIENT | REQUEST OR ALREADY REGISTERED | |

*DATA EXAMPLE

REQUEST PARAMETER (JSON)
```
{
 "......":"x.x.x.x",
 "%MIB(x.x.x.x ......)%",
 "......":"y.y.y.y",
 "%MIB(y.y.y.y ......)%",
 ......
}
```

EXECUTE PROCESSING ⇒

RESPONSE PARAMETER (JSON)
```
{
 "......":"x.x.x.x",
 "3101040000000132010000001ff":"4",
 "......":"y.y.y.y",
 ......
}
```

*FIG. 5A*

INSTANT TASK TABLE

| PROPERTY | FIRST KEY | SECOND KEY | REQUEST PARAMETER | RESPONSE PARAMETER | NOTIFICATION SOURCE | PROGRESS STATUS | DEVICE ID |
|---|---|---|---|---|---|---|---|
| VALUE | INSTANT TASK | [TRANSACTION ID] | [PROCESSING CONTENT] | [PROCESSING RESULT] | DEVICE OR CLIENT | REQUEST OR IN PROGRESS OR COMPLETED | [DEVICE ID] |

MASTER INITIAL FILE

```
[AzureConnect]
mode=master_bradmin  ---------------------------- A1
[Azure.Master]
connection.polling.interval=1  ------------------ A2
master_name=BRAdmin Master
master_id=AAAAAA
```

FIG. 6B

CLIENT INITIAL FILE (CLIENT PROFILE)

```
[AzureConnect]
mode=edgeclient  -------------------------------- B1
[Azure.Profile]
active=yes
name=
id=BBBBB
blob.saskey=XXXXXXXXXX  ------------------------- B2
table.saskey=XXXXXXXXXXXXX  --------------------- B3
client_name=BRAdminClient
client_id=CCCCC
connection.log.interval=300  -------------------- B4
client.network.interval=5  ---------------------- B5
client.usb.interval=60  ------------------------- B6
connection.polling.interval=1  ------------------ B7
```

MANAGEMENT PROGRAM, INFORMATION PROCESSING DEVICE, AND MANAGEMENT METHOD

CROSS REFERENCE TO RELATED APPLICATIONS

This application is based on Japanese Patent Applications No. 2021-013365 filed on Jan. 29, 2020, the entire contents of which are incorporated herein by reference.

BACKGROUND

The present disclosure relates to a technique for managing a terminal device.

A related art discloses a technique in which an agent connected to a network manages a printer connected to the network using an SNMP.

The agent may manage all the printers connected to the network. However, the network may include a printer that does not necessarily need to be managed by the agent. For example, there may be a printer that is managed by a management device different from the agent and thus does not need to be managed by the agent. When such a printer becomes a management target of the agent only because the printer is connected to the same network, the printer is managed by both the agent and the management device, and thus causing waste of management.

An object of an aspect of the present disclosure is to provide a management program that can appropriately manage a terminal device according to a managed capability of the terminal device.

SUMMARY

A management program according to an aspect of the present disclosure is a computer program executable by a computer provided in an information processing device. The information processing device may access a cloud storage and may communicate with a terminal device.

The terminal device may have a cloud access function of accessing the cloud storage. The terminal device having the cloud access function may alternatively set the cloud access function to be enabled or disabled.

The management program causes the computer to execute an enabling determination processing, a target setting processing, and a management processing.

The enabling determination processing is a processing of determining whether the cloud access function is enabled in the terminal device. The target setting processing is a processing of setting the terminal device as a management target in a case where it is determined that the cloud access function is not enabled in the enabling determination processing.

The management processing including acquiring terminal data that is data included in the management target from the management target and writing the acquired terminal data into the cloud storage, and/or reading processing request data from the cloud storage and causing the management target to execute a processing indicated by the processing request data. The processing request data is data written into the cloud storage and indicates the processing to be executed by the management target.

By executing such a program, whether the terminal device is set as a management target depends on whether the cloud access function of the terminal device is enabled. That is, in a case where the cloud access function of the terminal device is not enabled, the terminal device is set as a management target, and a management processing for the management target is executed. Therefore, it is possible to appropriately manage the terminal device according to the managed capability of the terminal device.

According to another aspect of the present disclosure, an information processing device including a computer that executes the management program described above may be provided. According to another aspect of the present disclosure, a system including the information processing device and the terminal device may be provided.

BRIEF DESCRIPTION OF THE DRAWINGS

FIG. 1 is a configuration diagram showing a management system according to an embodiment.

FIG. 5A is a diagram showing an example of a scheduled task table, and FIG. 5B is a diagram showing an example of an instant task table.

FIG. 6A is a diagram showing an example of a master initial file, and FIG. 6B is a diagram showing an example of a client initial file.

DETAILED DESCRIPTION

Figure 2A:
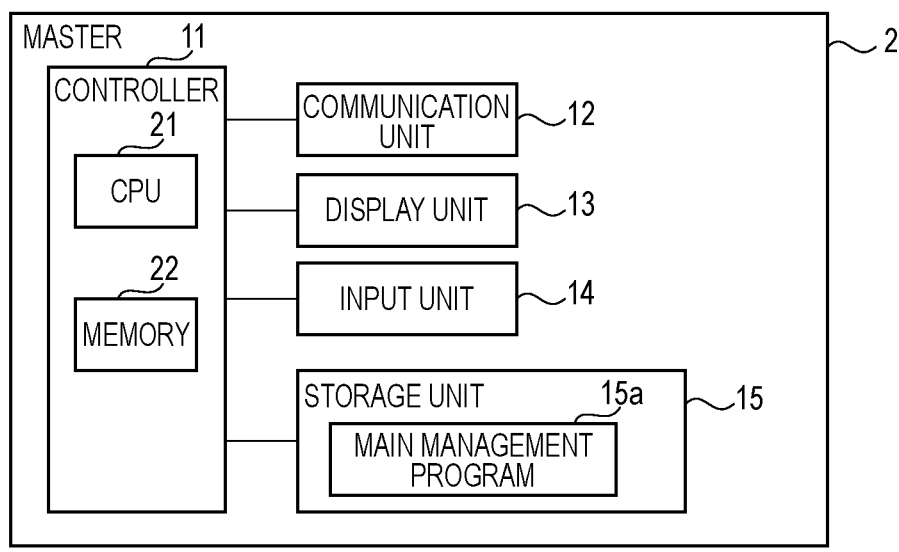
FIG. 2A is a block diagram showing a master.

Hereinafter, exemplary embodiments of the present disclosure will be described with reference to the drawings.

(1-1) Overall Configuration

A management system 1 according to an embodiment of the present disclosure is a network system configured to manage terminal devices 4 and 5 arranged in a plurality of bases via a cloud server 6, in cooperation with a master 2 and a client 3.

As shown in FIG. 1, the master 2 according to the present embodiment is installed in a first base. The master 2 may communicate with the terminal device 4 installed in the first base via a local area network. Further, the master 2 may communicate with the cloud server 6 via a wide area network. A plurality of terminal devices 4 may be provided in the first base.

The client 3 is installed in the second base. The client 3 may communicate, via a local area network, with the terminal device 4 installed in a second base. Further, the client 3 may communicate with the cloud server 6 via a wide area network. A plurality of terminal devices 4 may be provided in the second base.

Further, a terminal device 5 is installed in the second base. The client 3 may communicate with the terminal device 5 via a local area network in the second base. Further, the terminal device 5 may communicate with the cloud server 6 via a wide area network.

The local area network may include, for example, at least one of a wireless LAN and a wired LAN. The wide area network may include, for example, the Internet.

The terminal device 4 cannot use a cloud service provided by the cloud server 6. In other words, each terminal device 4 does not have a function of communicating with the cloud server 6. Hereinafter, the terminal device 4 is particularly referred to as a first type terminal device 4. On the other hand, the terminal device 5 is a terminal device that may use a cloud service provided by the cloud server 6. In other words, the terminal device 5 has a function of communicating with the cloud server 6. Such a function of the terminal device 5 is implemented by a communication program 82a (see FIG. 3A) to be described later. Hereinafter, the terminal device 5 is particularly referred to as a second type terminal device 5.

The first type terminal device 4 installed in the second base is managed by the master 2 via the client 3 and the cloud server 6. The second type terminal device 5 installed in the second base is basically managed by the master 2 via the cloud server 6 but not via the client 3. The second type terminal device 5 may be managed by the master 2 via the client 3 and the cloud server 6 in a similar manner to the first type terminal device 4.

Although details will be described later, a cloud connector that functions for connecting to the cloud server 6 is mounted in the second type terminal device 5. The cloud connector is implemented by a communication program 82a (see FIG. 3A) (that is, by a software processing) that will be described later and is installed in the second type terminal device 5. The communication program 82a may be mounted in the second type terminal device 5 as so-called firmware.

As will be described later, the cloud connector in the second type terminal device 5 may be enabled or disabled in the present embodiment. Disabling the cloud connector refers to a matter that although the cloud connector is physically mounted, the cloud connector does not exert a function of the cloud connector, that is, a part or all operations of the cloud connector is stopped and the cloud connector is brought into a state substantially equivalent to or close to a state in which the cloud connector is not mounted, so that the cloud connector is brought into a state in which the cloud connector cannot communicate with the cloud server 6.

When the cloud connector is enabled, the second type terminal device 5 (that is, the cloud connector) may access the cloud server 6 without passing through the client 3 and read data from the cloud server 6 and write data into the cloud server 6. That is, in this case, the second type terminal device 5 is managed by the master 2 via the cloud server 6 but not via the client 3. From the viewpoint of the master 2, it is not necessary to mediate the client 3 in order to manage the second type terminal device 5.

More specifically, connection setting for accessing the cloud server 6 needs to be executed in the cloud connector in the present embodiment in order to allow the enabled cloud connector to access the cloud server 6. The connection setting in the present embodiment includes, for example, setting a shared access signature (SAS) (see S07 in FIG. 4 to be described later). The SAS is set in the cloud server 6, which will be described later. In order to access the cloud server 6 and read and write data, the cloud connector needs to set the same SAS in the cloud connector.

On the other hand, when the cloud connector is disabled, the second type terminal device 5 cannot access the cloud server 6. Therefore, in this case, the second type terminal device 5 is managed by the master 2 via the client 3 and the cloud server 6. From the viewpoint of the master 2, it is necessary to mediate the client 3 in order to manage the second type terminal device 5. In the following description, the second type terminal device 5 in which the cloud connector is disabled is referred to as a "connector disabled terminal 5a".

Even when a cloud connector is mounted and enabled, the cloud connector may be brought into a state in which the cloud connector cannot access the cloud server 6. For example, an SAS is not set, or an SAS different from a regular SAS set in the cloud server 6 is set. In this case, the cloud connector may be able to communicate with the cloud server 6, but cannot function relative to the cloud server 6, such as reading data from the cloud server 6 and writing data into the cloud server 6. In the present embodiment, the second type terminal device 5 (hereinafter referred to as an "incompletely enabled terminal 5b") in which the cloud connector is enabled but cannot access the cloud server 6 in such a manner is also managed by being mediated through the client 3 in a similar manner to the first type terminal device 4.

Each of the terminal devices 4 and 5 has information such as a unique device ID, a model name, and an IP address. The terminal devices 4 and 5 may further incorporate a function of a web server. The web server incorporated in each of the terminal devices 4 and 5 is hereinafter referred to as an embedded web server (EWS). By using the EWS, it is possible to acquire states of the terminal devices 4 and 5 and change settings of the terminal devices 4 and 5 from an information processing device that is communicably connected to the terminal devices 4 and 5.

The terminal devices 4 and 5 managed by the master 2 may be, for example, a group of terminal devices managed by an organization such as a company. In this case, each base may be an activity base of an organization. For example, the first base where the master 2 is present may be an office of an organization management department. The other second and other bases (not shown) may be branch offices of organizations separated from the first base.

Examples of the terminal devices 4 and 5 include a printer, a scanner, and a digital multifunction device in which these functions are integrated. The master 2 and the client 3 are implemented, for example, by installing a dedicated computer program in an information processing device (for example, a personal computer).

(1-2) Device Configuration

The master 2 shown in FIG. 2A includes a controller 11, a communication unit 12, a display unit 13, an input unit 14, and a storage unit 15. The controller 11 includes a CPU 21 and a memory 22. The CPU 21 serving as a processor executes a processing according to a computer program stored in the storage unit 15. The memory 22 is used as a work memory when the above processing is executed.

The storage unit 15 includes, for example, a storage such as a solid state drive (SSD) and a hard disk drive (HDD), and stores various computer programs and data. The storage unit 15 stores a main management program 15a. The main management program 15a is a computer program for causing the CPU 21 to implement a management function to be implemented by the master 2. It may be understood that a processing mainly executed by the controller 11 is achieved by a processing executed by the CPU 21 in accordance with a computer program in the following description.

The communication unit 12 is connected to a local area network in a base where the master 2 is present, and is further connected to a wide area network. The communication unit 12 may be connected to a wide area network via a router (not shown). The display unit 13 is configured to display various screens for a user who operates the master 2. An example of the display unit 13 includes a liquid crystal display. Examples of the various screens include a screen for displaying log information and status information of the terminal devices 4 and 5 to be managed, and a screen for remotely operating the terminal devices 4 and 5 in accordance with an operation signal from the user.

The input unit 14 includes one or more input devices for inputting an operation signal from the user who operates the master 2, such as a keyboard and a pointing device. The controller 11 operates in accordance with an operation signal input via the input unit 14.

Figure 2B:
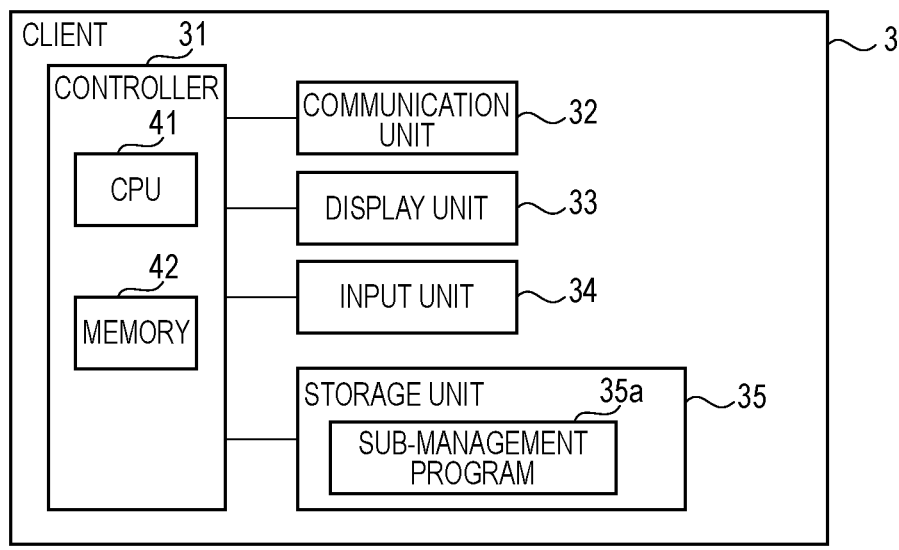
FIG. 2B is a block diagram showing a client.

The client 3 shown in FIG. 2B includes a controller 31, a communication unit 32, a display unit 33, an input unit 34, and a storage unit 35. The controller 31 includes a CPU 41 and a memory 42. The CPU 41 serving as a processor executes a processing according to a computer program stored in the storage unit 35.

The storage unit 35 stores a sub-management program 35a. The sub-management program 35a is a computer program for causing the CPU 41 to implement a management relay function to be implemented by the client 3. It may be understood that a processing mainly executed by the controller 31 is achieved by a processing executed by the CPU 41 in accordance with a computer program in the following description.

The management relay function is a function related to a management function of the master 2, and relays (or mediates) the management of the first type terminal device 4, the connector disabled terminal 5a, and the incompletely enabled terminal 5b that are managed by the master 2. The master 2 manages the first type terminal device 4, the connector disabled terminal 5a, and the incompletely enabled terminal 5b in a base different from the base where the master 2 is present, by using the management relay function of the client 3 provided in the different base. That is, the first type terminal device 4, the connector disabled terminal 5a, and the incompletely enabled terminal 5b that are connected to the same local area network as the client 3 are indirectly managed by the master 2 via the mediation of the client 3 by the management relay function of the client 3. The first type terminal device 4, the connector disabled terminal 5a, and the incompletely enabled terminal 5b that are connected to the same local area network as the client 3, that is, the first type terminal device 4, the connector disabled terminal 5a, and the incompletely enabled terminal 5b that are execution targets of the management relay function of the client 3, are also referred to as "management relay targets".

The communication unit 32 is connected to a local area network in a base where the client 3 is present, and is further connected to a wide area network. The communication unit 32 may be connected to a wide area network via a router (not shown). The display unit 33 includes, for example, a liquid crystal display, and is configured to display various screens for a user who operates the client 3. The input unit 34 includes one or more input devices for inputting an operation signal from a user who operates the client 3. The controller 31 operates in accordance with an operation signal input via the input unit 34.

Figure 2C:
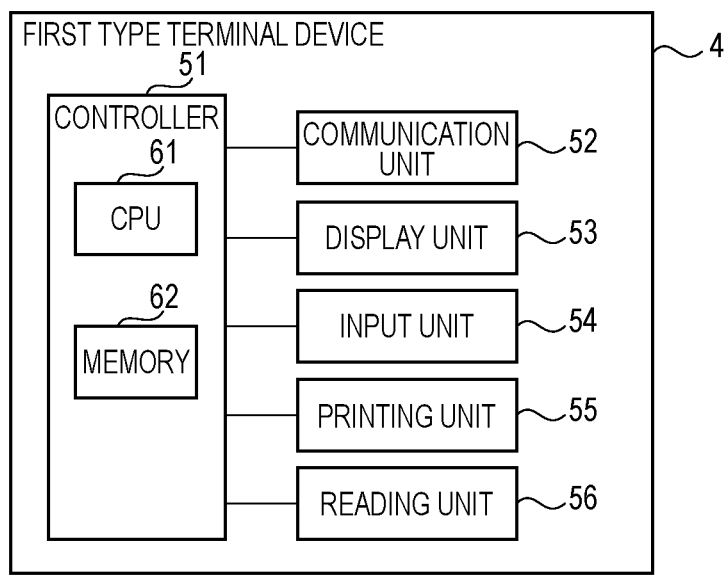
FIG. 2C is a block diagram showing a first type terminal device.

The first type terminal device 4 shown in FIG. 2C includes a controller 51, a communication unit 52, a display unit 53, and an input unit 54. When the first type terminal device 4 is a digital multifunction device, the first type terminal device 4 may further include a printing unit 55 and a reading unit 56. The first type terminal device 4 may include only one of the printing unit 55 and the reading unit 56.

The controller 51 includes a CPU 61 and a memory 62. The memory 62 may include a nonvolatile memory such as a flash memory in addition to a RAM, and may store a computer program, setting data, and the like in the nonvolatile memory.

The CPU 61 serving as a processor executes overall control of the entire first type terminal device by executing a processing according to a computer program stored in the memory 62. It may be understood that a processing mainly executed by the controller 51 is achieved by a processing executed by the CPU 61 in accordance with a computer program in the following description.

The communication unit 52 is connected to a local area network in a base where the first type terminal device 4 is present, so that the communication unit 52 may communicate with the master 2 or the client 3 present in the local area network. The display unit 53 includes, for example, a liquid crystal display, and is configured to display various screens for a user who operates the first type terminal device 4. The input unit 54 includes one or more input devices such as a touch panel on a liquid crystal display in order to input an operation signal from a user.

The printing unit 55 is configured to print an image on a sheet under the control of the controller 51. Examples of the printing unit 55 include an inkjet printer and a laser printer. According to the present embodiment, status information such as a remaining amount of a color material and log information such as the number of printed sheets are provided from the first type terminal device 4 to the master 2 via the client 3 and the cloud server 6 by a method to be described later. The reading unit 56 is configured to read a reading target such as a printed matter under the control of the controller 51.

Figure 3A:
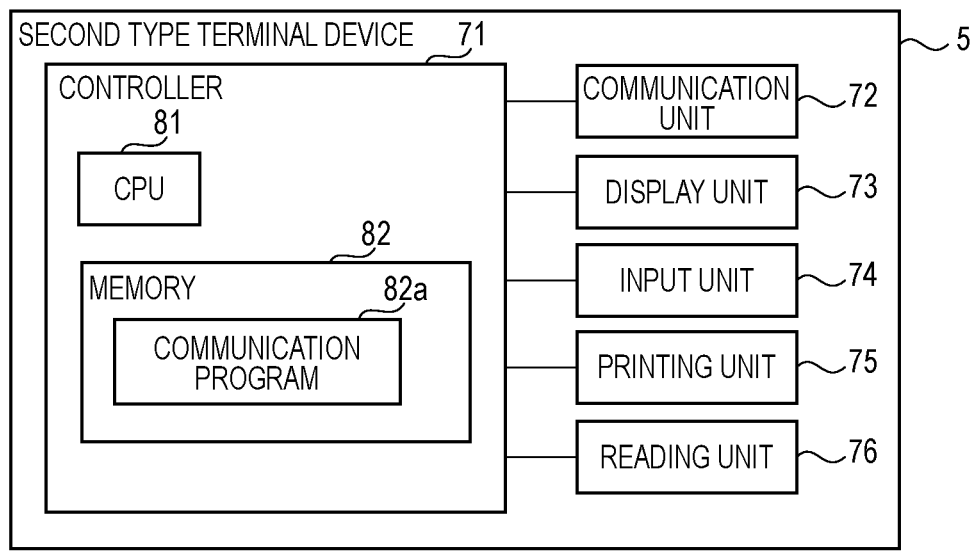
FIG. 3A is a block diagram showing a second type terminal device.

The second type terminal device 5 shown in FIG. 3A includes a controller 71, a communication unit 72, a display unit 73, and an input unit 74. When the second type terminal device 5 is a digital multifunction device, the second type terminal device 5 may further include a printing unit 75 and a reading unit 76. The second type terminal device 5 may include only one of the printing unit 75 and the reading unit 76.

The controller 71 includes a CPU 81 and a memory 82. The memory 82 may include a nonvolatile memory such as a flash memory, and may store a computer program, setting data, and the like in the nonvolatile memory.

The CPU 81 serving as a processor executes overall control of the entire device by executing a processing in accordance with a computer program stored in the memory 82. The memory 82 stores the communication program 82a described above. The communication program 82a is a program for using a cloud service provided by the cloud server 6. It may be understood that a processing mainly executed by the controller 71 is achieved by a processing executed by the CPU 81 in accordance with a computer program in the following description.

The second type terminal device 5 may function as the cloud connector described above by the communication program 82a. The cloud connector may be enabled or disabled as described above. The cloud connector may be enabled or disabled by any method. In the present embodiment, for example, a user may perform a predetermined operation via the input unit 74 of the second type terminal device 5 so that the cloud connector may be selectively switched between an enabled state and a disabled state. For example, the EWS described above may be used to remotely switch from an information processing device different from the second type terminal device 5.

When the cloud connector receives a request for connector setting information from the client 3, the cloud connector transmits the connector setting information to the client 3. The connector setting information is information indicating whether the cloud connector is brought into a state in which the cloud connector may actually access the cloud server 6.

In the present embodiment, the connector setting information includes, for example, enabled information and cloud connection setting information. The enabled information is information indicating whether the cloud connector is enabled or disabled. The cloud connection setting information is information indicating whether the cloud server 6 is actually accessible. The cloud connection setting information may include, for example, an SAS, and may include history information indicating that the could connector actually accessed the cloud server 6. The presence of the history information may be regarded as a state in which a regular SAS is registered and the cloud server 6 is actually accessible.

The communication unit 72 is connected to a local area network of a base where the second type terminal device 5 is present, so that the communication unit 72 may communicate with the master 2 or the client 3 present in the local area network. Further, the communication unit 72 is connected to a wide area network, so that the communication unit 72 may communicate with the cloud server 6. The display unit 73 includes, for example, a liquid crystal display. The input unit 74 includes one or more input devices for inputting an operation signal from a user.

The printing unit 75 is configured to print an image on a sheet under the control of the controller 71. According to the present embodiment, status information such as a remaining amount of a color material and log information such as the number of printed sheets are provided from the second type terminal device 5 to the master 2 via the cloud server 6 by a method to be described later. The reading unit 76 is configured to read a reading target such as a printed matter under the control of the controller 71.

Figure 3B:
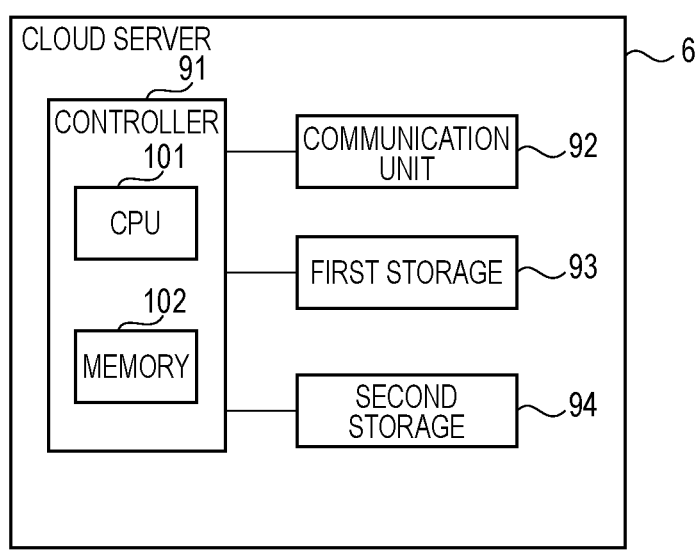
FIG. 3B is a block diagram showing a cloud server.

The cloud server 6 shown in FIG. 3B includes a controller 91, a communication unit 92, a first storage 93, and a second storage 94. The controller 91 includes a CPU 101 and a memory 102.

The CPU 101 serving as a processor executes a processing in accordance with a computer program stored in the memory 102. A processing executed by the CPU 101 includes a processing for causing the cloud server 6 to function as a cloud storage. It may be understood that a processing mainly executed by the controller 91 is achieved by a processing executed by the CPU 101 in accordance with a computer program in the following description.

The cloud storage includes a table storage and an object storage. The controller 91 executes the processing described above, so that the first storage 93 functions as a table storage and the second storage 94 functions as an object storage.

The first storage 93 in the example functions as a NoSQL data store, and may store various tables (for example, see FIGS. 5A and 5B to be described later) having a group of schema-less entities as constituent elements. That is, the first storage 93 is a type of database, and the database is written into the first storage 93.

In the first storage 93, each entity in the table includes a set of properties. Each property includes a pair of a key and a value. For example, the master 2, the client 3, and the cloud connector may access desired data in a table in the first storage 93 to read the data or update the desired data in the table by designating an entity and a key.

The entity may be considered as a matter similar to a position of a record in a relational database. The property may be considered as a matter similar to a position of a column (or field) in a relational database. The key in the property may be considered as a matter similar to a position of an item name (or head) in a relational database. The value may be considered as a matter similar to a position of a field in a relational database.

The second storage 94 in the example functions as an object storage in which an object may be read and written from the outside. The object includes, for example, any text file and/or a binary file. That is, it may be said that the second storage 94 is a file storage that stores a file. Reading an object from the second storage 94 and writing an object into the second storage 94 are executed using, for example, an HTTP/HTTPS protocol. For example, the master 2, the client 3, and the cloud connector 5 may access (for example, read) a desired file stored in the second storage 94 by designating a file name and a path.

Azure of Microsoft Corporation is known as a cloud service providing the table storage and the object storage described above. The cloud server 6 may operate in the same manner as such a cloud service. For example, the first storage 93 may be an Azure Table Storage in Azure, and the second storage 94 may be an Azure Blob Storage in Azure. Azure is a registered trademark of Microsoft Corporation.

(1-3) Sequence Outline

Figure 4:
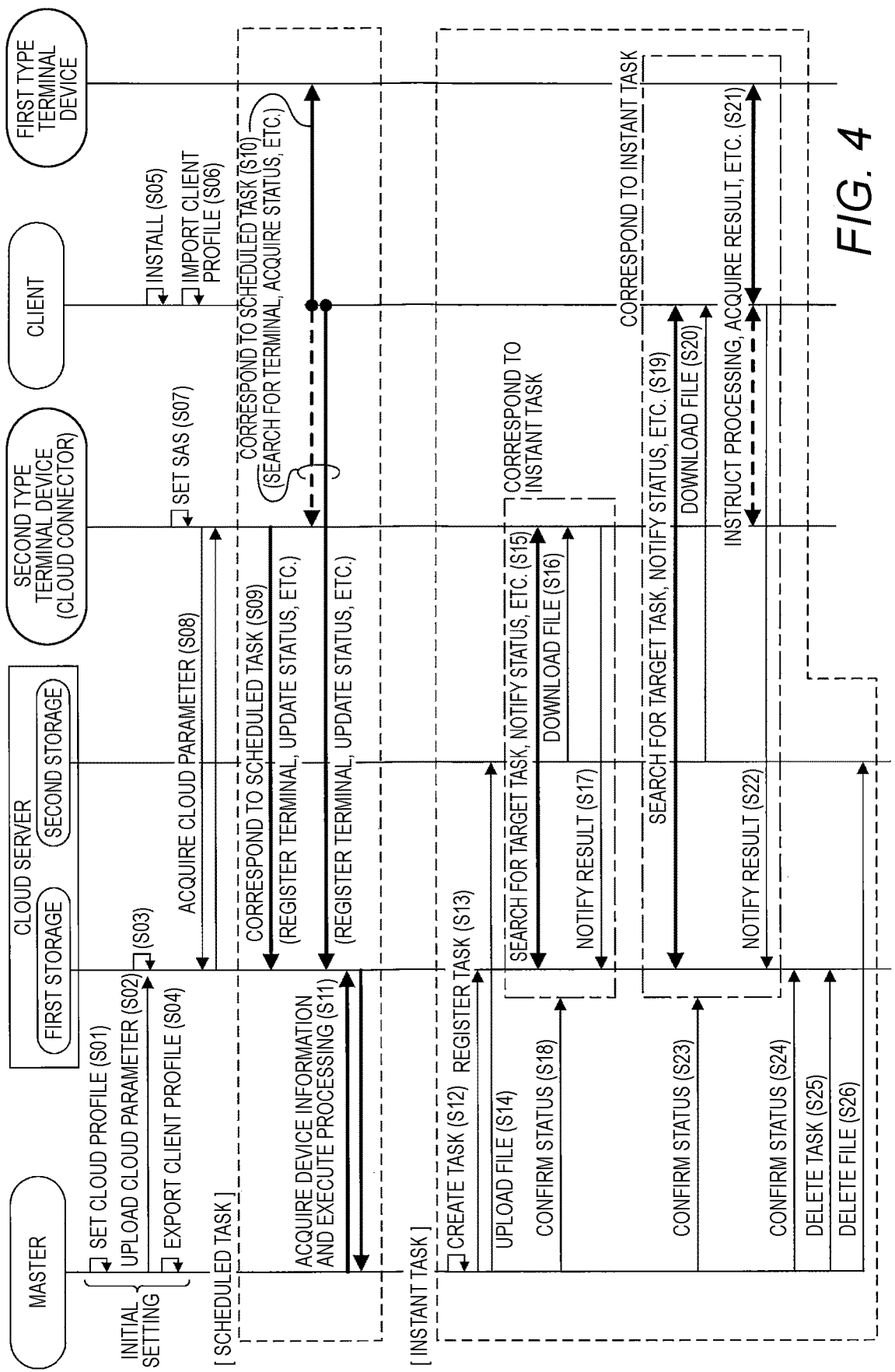
FIG. 4 is a diagram showing an example of a management sequence executed by the management system.

Next, an operation sequence related to a management will be schematically described with reference to FIG. 4. In a preparation stage, the main management program 15a is installed in the master 2 by an installer. An installer of the main management program 15a and an installer of the sub-management program 35a may be prepared separately from each other. In the present embodiment, one common installer (hereinafter, referred to as a "common installer") selectively installs one of the main management program 15a and the sub-management program 35a. After the common installer is activated, the common installer refers to an initial file and determines which one of the main management program 15a and the sub-management program 35a is to be installed.

For example, there are two types of initial files. Specifically, there may be a master initial file corresponding to the main management program 15a and a client initial file corresponding to the sub-management program 35a. An example of the master initial file is shown in FIG. 6A. An example of the client initial file is shown in FIG. 6B.

The master initial file may be generated anywhere and in any manner. For example, the master initial file may be generated by a text editor or the like in accordance with an input operation executed on the input unit 14 of the master 2 by a main administrator who is a user of the master 2.

In the present embodiment, the client initial file is automatically generated based on the main management program 15a, which will be described later. The client initial file may also be generated in accordance with an input operation by a user in a similar manner to the master initial file.

In the master initial file shown in FIG. 6A, a reference numeral A1 indicates an operation mode. The operation mode defines whether an initial file is a master file or a client file. In other words, the operation mode defines which one of the main management program 15a and the sub-management program 35a is to be installed in accordance with the initial file. In the example shown in FIG. 6A, the operation mode indicates a master operation mode. In the client initial file, an operation mode is set as indicated by a reference numeral B1 in FIG. 6B. In FIG. 6B, the operation mode indicates a client operation mode.

A reference numeral A2 indicates a first polling cycle. FIG. 6A shows an example in which the first polling cycle is, for example, one minute. The first polling cycle is used as a cycle when the master 2 confirms an execution status of an instant task by polling after a request for the instant task to be described later (see S18, S23, and S24 in FIG. 4).

In order to install the main management program 15a by using the common installer, the common installer may refer to the master initial file at the time of executing an installation processing. For example, the common installer may be activated in a state in which the common installer and the master initial file are stored in the same folder. Accordingly, after the common installer is activated, the common installer proceeds with the installation processing while referring to the master initial file in the same folder.

Specifically, the common installer installs the main management program 15a in response to a matter that the operation mode indicates a master operation mode in the master initial file. At this time, information set in the master initial file is incorporated as appropriate. When the initial file is a client initial file and the operation mode indicates a client operation mode (for example, the example in FIG. 6B), the common installer installs the sub-management program 35a. In this case, the common installer also appropriately incorporates information set in the client initial file.

When the main management program 15a is installed in the master 2, a processing in accordance with the main management program 15a is executed by the controller 11 of the master 2. That is, the master 2 has a management function.

The processing in accordance with the main management program 15a includes a processing of setting a cloud profile (S01). For example, the setting of the cloud profile (S01) is executed in accordance with a setting operation executed by the main administrator via the input unit 14.

The setting of the cloud profile (S01) includes setting of a cloud parameter. The cloud parameter includes an initial setting parameter. In the client 3 and the cloud connector, a polling operation for the cloud server 6 and an update operation of information stored in the cloud server 6 are executed, which will be described later. The polling operation is an operation of periodically checking the presence or absence of an instant task to be described later. The information update operation is included in a scheduled task to be described later.

The initial setting parameter includes, for example, a polling operation cycle (hereinafter, referred to as a "second polling cycle") and an information update operation cycle (hereinafter, referred to as an "information update cycle"). For example, the second polling cycle is one minute as shown by a reference numeral B7 in FIG. 6B in the present embodiment. A plurality of types of information update cycles may be set according to types of information to be updated. For example, three types indicated by reference numerals B4, B5, and B6 in FIG. 6B are set as the information update cycle in the present embodiment.

The cloud parameter may further include a scheduled task template. The scheduled task template defines what kind of processing is to be specifically executed by each of the terminal devices 4 and 5 as a scheduled task to be described later. The information update cycle described above corresponds to an execution cycle of one or more processings (tasks) in the scheduled task. The scheduled task template may be a table in the same format as a scheduled task table (see FIG. 5A) to be described later, and may indicate initial setting data of the scheduled task table.

The scheduled task template and the scheduled task table are present individually. That is, in the first storage 93, the scheduled task template is written into a first storage area, and the scheduled task table is written into a second storage area different from the first storage area.

The setting of the cloud profile (S01) further includes setting an SAS for using the cloud service. The SAS is individually set for each of the first storage 93 and the second storage 94, that is, for each of the table storage and the object storage. In the setting of the cloud profile in the master 2 (S01), the main administrator sets the SAS to be set in each of the first storage 93 and the second storage 94 as a part of the cloud profile so that the master 2 may access the first storage 93 and the second storage 94.

The same SAS is also set when the main management program 15a is installed in the master 2. When the master 2 accesses the cloud server 6, the SAS set in the master 2 is transmitted to the cloud server 6. When the transmitted SAS matches the SAS of an access destination set in the cloud server 6, communication (reading and writing of data) with the access destination is enabled.

Subsequently, in accordance with an operation of the main administrator, the cloud parameter in accordance with the set cloud profile is uploaded from the master 2 to the first storage 93 of the cloud server 6 (S02), and is written into the first storage 93 (S03). The initial setting parameter including the second polling cycle and the information update cycle are written into the first storage 93 as entities of a table. Each processing in the scheduled task template is also written into the first storage 93 as an entity of the table.

Further, at least a part of the cloud profile is exported from the master 2 as a client profile, that is, data to be read by the client 3 (S04). The client profile corresponds to the client initial file described above as shown in FIG. 6B. For example, the client profile may include at least one of the initial setting parameter, the scheduled task template, and the SAS described above. For example, the client profile may include at least the SAS.

In the client profile shown in FIG. 6B, a reference numeral B2 indicates an SAS for accessing the second storage 94, and a reference numeral B3 indicates an SAS for accessing the first storage 93. Reference numerals B4 to B7 are as described above. The reference numeral B1 indicates an operation mode.

That is, an operation mode is also set in the client profile in a similar manner to the master initial file. The operation mode is set to the client initial file in the client profile as shown by the reference numeral B1 in FIG. 6B.

The client profile exported by the master 2 is provided to the client 3. The client profile may be provided to the client 3 by any method. For example, the client profile may be transmitted from the master 2 to the client 3 by e-mail or another method. For example, the client profile may be provided to a sub-administrator who is a user of the client 3 by the main administrator. More specifically, for example, the main administrator may store the client profile in an information processing terminal owned by the main administrator and transmit the client profile to another information processing terminal owned by the sub-administrator, so that the sub-administrator may transfer the client profile from the another information processing terminal to the client 3. The main administrator may transmit the client profile from the information processing terminal of the main administrator to the client 3. For example, the main administrator may store the client profile in a predetermined storage and provide the storage to the sub-administrator, so that the sub-administrator may transfer the client profile from the storage to the client 3.

The sub-administrator operates the client 3, activates the common installer, and installs the sub-management program 35a in the client 3 (S05). In order to install the sub-management program 35a using the common installer, the client profile exported by the master 2 is imported to the common installer at the time of executing an installation processing (S06). For example, the common installer may be activated in a state in which the common installer and the client profile are stored in the same folder in the client 3.

Accordingly, after the common installer is activated, the common installer advances the installation processing while importing the client profile in the same folder (S05 and S06). At this time, the common installer determines that the sub-management program 35a is to be installed in accordance with the fact that the operation mode indicates the client initial file, and installs the sub-management program 35a.

The common installer imports the client profile in the installation of the sub-management program 35a. That is, various kinds of data set in the client profile are appropriately set in the client 3. For example, the SAS, the second polling cycle, the information update cycle, and the like set in the client profile are imported and set in the client 3. The scheduled task template described above may be imported.

When the sub-management program 35a is installed and the client profile is set as described above, the client 3 may use the cloud server 6. Accordingly, the client 3 may transmit information to the master 2 via the cloud server 6. Specifically, the client 3 may execute, via the cloud server 6, the management relay function described above, that is, a relay operation between the master 2 and the management relay target, such as an execution instruction of a task from the master 2 to the management relay target and transmission of log information and status information from the management relay target to the master 2.

On the other hand, the SAS is registered in the second type terminal device 5 by an input operation of a device administrator who is an administrator of the second type terminal device 5 (S07). More specifically, the SAS is registered in the cloud connector. Registration of the SAS in the cloud connector may be executed, for example, via the input unit 74 of the second type terminal device 5. For example, the SAS may be registered in the cloud connector by transmitting the SAS to the second type terminal device 5 from an information processing device different from the second type terminal device 5. Specifically, the SAS may be remotely registered from the information processing device different from the second type terminal device 5 by accessing the EWS of the second type terminal device 5 from an information processing device.

The cloud connector in which the SAS is registered accesses the first storage 93 of the cloud server 6 using the SAS, and refers to the cloud parameter written by the master 2 (S08). The cloud connector acquires the cloud parameter and sets the cloud parameter in an own device (S08).

When the cloud connector accesses the cloud server 6, first, the SAS registered in the cloud connector is transmitted to the cloud server 6. When the transmitted SAS matches the SAS set in the cloud server 6, the cloud connector may actually access the cloud server 6 (that is, read and write data). Since SASes are individually set in the first storage 93 and the second storage 94, the SASes are also individually registered in the cloud connector, and the SASes are transmitted to the cloud server 6. The SASes are individually processed in the cloud server 6. Therefore, for example, a situation may occur in which the first storage 93 is accessible but the second storage 94 is not accessible due to a mismatch of the SAS registered in the cloud server and the SAS set in the cloud server 6.

When the initial setting (S05 to S08) of the client 3 and the cloud connector (cloud connector) including the setting of the cloud parameter and the SAS described above is completed, the client 3 and the cloud connector periodically execute a scheduled task of updating information stored in the first storage 93 of the cloud server 6 according to the set information update cycle (S09 and S10).

When corresponding device information is not registered in the first storage 93, first, the scheduled task (S09) to be executed by the cloud connector starts from registering the device information in the first storage 93. The device information corresponding to the cloud connector is predetermined information indicating the second type terminal device 5 on which the cloud connector is mounted.

The scheduled task (S10) to be executed by the client 3 mainly includes a periodic search task of periodically searching for and updating a management relay target, and a periodic update task for each management relay target searched in the periodic search task. The periodic update task includes, for example, newly registering an unregistered management relay target in the cloud server 6 among management relay targets that are searched most recently, acquiring various types of information such as log information and status information from the management relay target and uploading the acquired information to the first storage 93 of the cloud server 6, and the like. The information update cycle described above is set for each of the periodic search task and the periodic update task. Each of the periodic search task and the periodic update task is periodically and repeatedly executed according to a corresponding information update cycle.

Figure 7:
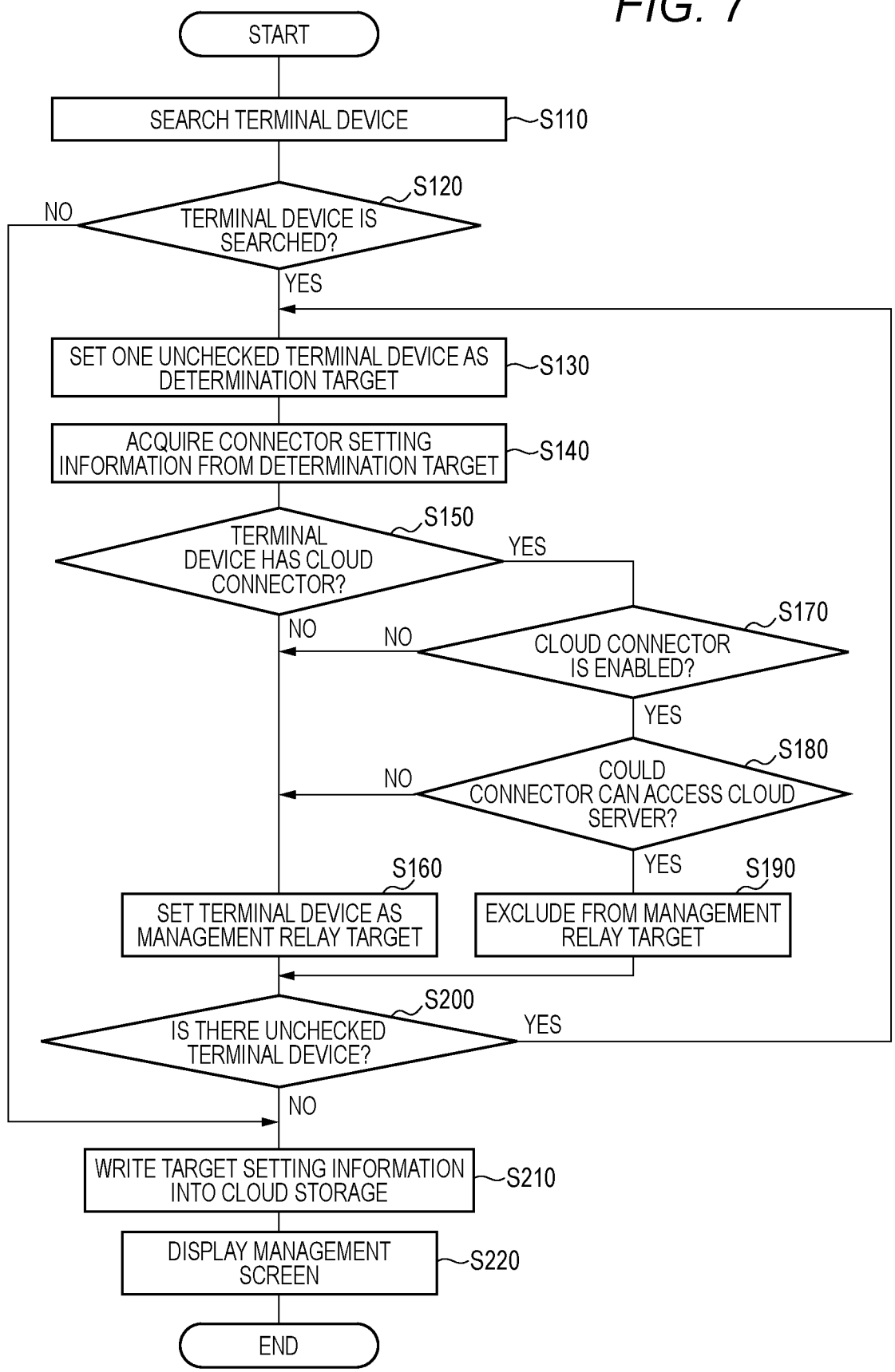
FIG. 7 is a flowchart showing a periodic search task processing.

A specific example of the periodic search task is shown in FIG. 7. The controller 31 of the client 3 reads and executes a program of the periodic search task processing shown in FIG. 7 every time an execution timing of the periodic search task arrives. The program of the periodic search task processing is a part of the sub-management program 35a.

When the periodic search task processing is started, the controller 31 of the client 3 searches for a terminal device in S110. That is, the client 3 checks the presence of a terminal device that may be a management relay target in the same local area network as the client 3. The terminal device may be searched by any method. For example, the terminal device may be searched by broadcasting in accordance with a simple network management protocol (SNMP).

The controller 31 recognizes the presence of the terminal device when the controller receives device information transmitted from the terminal device. The device information may include a device ID, a model name, an IP address, and the like. Both the first type terminal device 4 and the second type terminal device 5 may be searched in S110.

In S120, it is determined whether at least one terminal device is searched by the processing in S110, when no terminal device is searched, the periodic search task processing is ended. When one or more terminal devices are searched, the processing proceeds to S130.

In S130, one terminal device that is not checked among the one or more searched terminal devices is set as a determination target. Here, the checking refers to the processings in S140 to S190.

In S140, the connector setting information is acquired from the terminal device to be determined. The connector setting information includes the enabled information and the cloud connection setting information described above. The connector setting information may be acquired by any method. For example, the connector setting information may be acquired from the determination target by requesting the determination target in accordance with an SNMP. When the terminal device to be determined is the first type terminal device 4, the connector setting information is not acquired because the terminal device does not have a cloud connector. On the other hand, when the terminal device to be determined is the second type terminal device 5, the connector setting information is acquired because the terminal device has a cloud connector.

In S150, it is determined whether the terminal device to be determined has a cloud connector (that is, whether the terminal device to be determined is the second type terminal device 5) based on the connector setting information acquired in S140. For example, in a case where the connector setting information is not acquired in S140, it is determined that the terminal device to be determined does not have a cloud connector, that is, the terminal device to be determined is the first type terminal device 4, and the processing proceeds to S160.

In S160, the terminal device to be determined is set as a management relay target. After S160, the processing proceeds to S20). For example, in a case where the connector setting information is acquired in S140, it is determined in S150 that the terminal device to be determined has a cloud connector, that is, the terminal device to be determined is the second type terminal device 5, and the processing proceeds to S170.

In S170, it is determined whether the cloud connector of the terminal device to be determined is enabled. This determination may be executed based on, for example, the enabled information included in the connector setting information. When the cloud connector of the terminal device to be determined is disabled, the processing proceeds to S160. In this case, although the terminal device to be determined is the second type terminal device 5, the terminal device to be determined is set as a management relay target of the client 3.

In S170, when the cloud connector of the terminal device to be determined is enabled, the processing proceeds to S180. In this stage, the terminal device to be determined may be excluded from the management relay target of the client 3. In the present embodiment, it is determined whether the terminal device to be determined is the management relay target of the client 3 by further executing the processing in S180.

That is, in S180, it is determined whether the cloud connector of the terminal device to be determined may access the cloud server 6. This determination may be executed, for example, based on the cloud connection setting information included in the connector setting information. When the cloud connector of the terminal device to be determined cannot access the cloud server 6, the processing proceeds to S160. In this case, although the terminal device to be determined is the second type terminal device 5 and the cloud connector is enabled, the terminal device to be determined is set as a management relay target of the client 3.

In S180, when the cloud connector of the terminal device to be determined may access the cloud server 6, the processing proceeds to S190. In S190, the terminal device to be determined is excluded from the management relay target. After S190, the processing proceeds to S200.

In S200, it is determined whether there is a terminal device that is not checked as described above among the one or more terminal devices searched in S110. When there is a terminal device that is not checked, the processing proceeds to S130. When all of the searched terminal devices are checked as described above, the processing proceeds to S210.

In S210, target setting information is written into the first storage 93 of the cloud server 6. The target setting information includes, for each of the terminal devices searched in S110, information indicating whether the terminal device is set as a management relay target.

In S220, the target setting information is displayed on the display unit 33. For example, a screen on which the searched terminal devices and the presence or absence of setting of a management relay target are listed in association with each other may be displayed. By viewing the screen, a user may recognize information such as which terminal device (or how many terminal devices) is searched and whether each of the searched terminal devices is set as a management relay target. After the processing in S220, the periodic search task processing is ended.

The description will be continued returning to FIG. 4. In the periodic update task included in the scheduled task (S10) of the client 3, the above-described processing of registering an unregistered management relay target is executed. Specifically, for example, device information of the unregistered management relay target is registered in a corresponding table in the first storage 93.

The first storage 93 includes the scheduled task table as shown in FIG. 5A serving as one table. The scheduled task table includes a group of one or more entities. One entity includes a plurality of properties. In the present embodiment, examples of the plurality of properties include a first key, a second key, a request parameter, a response parameter, a notification source, a progress status, and a device ID, as shown in FIG. 5A.

The scheduled task table includes three entities related to "log", "status", and "registration" for each of the terminal devices 4 and 5. That is, in the present embodiment, there is an individual scheduled task table (hereinafter, referred to as an "individual table") for each of the terminal devices 4 and 5 to be managed, and the scheduled task table may be regarded as an aggregation of these individual tables. Each individual table includes three entities related to "log", "status", and "registration" of a corresponding terminal device.

When the corresponding terminal device is the first type terminal device 4, information in the entity is updated by the client 3 that manages the first type terminal device 4 (S10). When the corresponding terminal device is the second type terminal device 5, information in the entity is updated by the cloud connector of the second type terminal device 5 (S09). However, even when the corresponding terminal device is the second type terminal device 5, in a case where the terminal device is set as the management relay target of the client 3 in the periodic search task processing, the terminal device is updated by the client 3 (S10).

In the scheduled task table shown in FIG. 5A, the property of the "notification source" in the entity indicates an updater of the entity. When the entity is updated by the client 3, the property of the "notification source" in the entity is updated to a value "client". When the entity is updated by the cloud connector, the property of the "notification source" in the entity is updated to a value "device".

The entity related to "log" is a log entity having a value "log" in the first key, and log information of a terminal device to be managed corresponding to the device ID described as a value in the second key is described in the response parameter. The device ID is an ID unique to each of the terminal devices 4 and 5.

When the corresponding terminal device is a printer or a digital multifunction device, the log information may include information about the total number of printed sheets of the corresponding terminal device. The log information may include, as a print history, information about a user of a print command source and the number of printed sheets for each print job. There may be a plurality of types of log information to be managed, and there may be a plurality of log entities respectively corresponding to the plurality of types of log information.

As shown in FIG. 5A, the response parameter may include, for example, JSON data. For example, the log information may be described in a JSON format by associating an object identifier (OID) used in a management information base (MIB) of a corresponding parameter with a value of the object identifier. The description "x.x.x.x. x . . . " ↘ "y.y.y.y.y . . . " in a lower part of FIG. 5A is an abstract representation showing an example of the object identifier.

The response parameter in an initial state before being updated may be present as a request parameter in which an initial value is associated with the object identifier. According to the example shown in FIG. 5A, OIDs "y.y.y.y.y . . . " and initial values "% MIB (y.y.y.y.y . . . )%" may be present as the request parameter. The log information indicated by the request parameter is actually acquired from a management target and is described as a value of the response parameter in the table. The value of the response parameter is updated every time a scheduled task is executed. The lower part of FIG. 5A shows an example in which, for example, the predetermined log information is updated from an initial value described in the request parameter to a value "4" and is described as a value of the response parameter.

For each of the "status" and "registration" in the first key, an initial value is set in the request parameter, and an actual value corresponding to the initial value is written into the response parameter in a similar manner to the "log".

The entity related to the "status" is a status entity having a value "status" in the first key, and describes, in the response parameter, the status information of a terminal device to be managed corresponding to the device ID described as a value in the second key.

When the corresponding terminal device is a printer or a digital multifunction device, the status information may include information about a remaining amount of a color material of the corresponding terminal device and error information such as a paper jam. There may be a plurality of types of status information to be managed, and there may be a plurality of status entities respectively corresponding to the plurality of types of status information. Similar to the log entity, the response parameter may be described in a JSON format in the status entity.

The entity related to "registration" is a registration entity having a value "registration" in the first key, and the device information of a terminal device to be managed corresponding to the device ID described as a value in the second key is described in the response parameter. A plurality of item values for explaining a basic configuration of the device are described as the device information in the response parameter.

In the scheduled task table, the entity of the cloud connector of the second type terminal device 5 is updated by the cloud connector (S09) except when the second type terminal device 5 is set as a management relay target of the client 3 in the periodic search processing. The entity of the first type terminal device 4 is updated by the client 3 connected to the same local area network as the first type terminal device 4 (S10). The entity of the second type terminal device 5 set as the management relay target is updated by the client 3 connected to the same local area network as the second type terminal device 5 (S10). That is, the entity of each of the first type terminal device 4 and the second type terminal device 5 serving as the management relay target of the client 3 is updated by the client 3.

The client 3 communicates with the management relay targets in the same local area by a processing of the controller 31 in accordance with the sub-management program 35a, and acquires information necessary for updating the device information from the management relay targets. The client 3 may update the registration entity of a corresponding management relay target in the scheduled task table based on the acquired information (S10).

Further, the client 3 periodically communicates with the management relay targets in the local area, and acquires corresponding log information and status information. The client 3 may update the log entity and the status entity of a corresponding management relay target in the scheduled task table in the first storage 93 of the cloud server 6 based on the acquired log information and status information (S10).

The cloud connector that may access the cloud server 6 may periodically access the cloud server 6 and update the log entity and status entity of the cloud connector in the first storage 93 so as to update the log information and the status information of the cloud connector (S09).

The master 2 also functions as the client 3. That is, it may be understood that the master 2 functions as the client 3 for the first type terminal device 4 in the first base. Specifically, in the scheduled task table in the first storage 93 of the cloud server 6, three entities related to "log", "status", and "registration" are generated corresponding to each of the first type terminal devices 4 (hereinafter, referred to as "master subordinate terminal device") in the first base. Similar to the client 3, the master 2 may acquire various kinds of information from the master subordinate terminal device and update the registration entity, the log entity, and the status entity of each corresponding master subordinate terminal device in the scheduled task table of the first storage 93.

Further, the master 2 periodically accesses the cloud server 6 and refers to the log entity, the status entity, and the registration entity of each of the terminal devices 4 and 5 in the scheduled task table of the first storage 93 (S11). Based on these references, the master 2 may execute a processing of storing the log information, the status information, and the device information of each of the terminal devices 4 and 5 in the storage unit 15 (S11).

Further, the master 2 may display a list of the registered terminal devices 4 and 5 or display the log information and the status information of the terminal devices 4 and 5 on a screen of the display unit 13 in accordance with an operation signal from a user via the input unit 14 (S11). As described above, the management system 1 may remotely monitor states of the terminal devices 4 and 5 used in a plurality of bases in one base where the master 2 is installed.

According to the management system 1, an instant task that is a non-periodic task other than the scheduled task is executed by the terminal devices 4 and 5 to be requested based on a request from the master 2. The master 2 registers the entity of the instant task (hereinafter, referred to as an "instant task entity") in the first storage 93 so as to request the corresponding terminal devices 4 and 5 to execute the instant task (S13). For example, update of firmware in one or more terminal devices is implemented as one instant task.

The master 2 receives an instant task execution request operation from the main administrator in accordance with an operation signal from the main administrator via the input unit 14 (S12). The master 2 generates data indicating an instant task entity in accordance with the execution request operation of the main administrator and transmits the data to the cloud server 6, so that the instant task entity may be registered in the first storage 93 (S13).

The instant task entity is registered in the first storage 93 in a form of, for example, an instant task table shown in FIG. 5B. Similar to the scheduled task table, the instant task table includes a group of entities including properties of a first key, a second key, a request parameter, a response parameter, a notification source, a progress status, and a device ID.

An "instant task" is described as a value of the first key in the instant task entity in the instant task table. The property of the second key has a value of a transaction ID in the instant task entity. The transaction ID is an ID unique to each of instant tasks that are generated at the same time and is used to distinguish entities of a plurality of instant tasks that are generated at the same time.

The device ID of a terminal device requesting an instance task is described as a value in the property of the device ID in the instant task entity. For example, when an instant task is requested for all management relay targets of the client 3, the device IDs of all of the management relay targets are described in the property of the device ID.

The request parameter in the instant task entity includes, as a value, data describing processing content to be executed as an instant task. The processing content is described as, for example, JSON data. That is, the instant task entity requests a terminal device indicated by the device ID described in the property of the device ID to execute the processing content indicated by the value described in the request parameter.

When a predetermined file is required to execute an instant task, the master 2 stores the file in the second storage 94 (S14). In this case, information (for example, an URL) indicating a storage destination of the file is described in the request parameter. For example, when the instant task is to update firmware in the terminal devices 4 and 5, the master 2 stores an update file necessary for the update of the firmware in the second storage 94 (S14). In this case, for example, the storage destination URL of the update file of the firmware may be described in the request parameter.

The cloud connector that may access the cloud server 6 accesses the first storage 93 of the cloud server 6 in the set polling cycle, and searches for an instant task targeted for the cloud connector (S15). That is, the cloud connector determines whether a new entity of an instant task to be executed by the cloud connector is registered in the instant task table (S15).

When the new entity is registered, the cloud connector updates a value of the property of the progress status of a corresponding instant task entity in the instant task table in the first storage 93 from "request" to "in progress", thereby transmitting the reception of the instant task request to the master 2 (S15).

The master 2 in which the instant task entity is registered confirms a status of the instant task corresponding to the instant task entity (S18). Specifically, the master 2 periodically refers to the instant task entity in the instant task table registered in the first storage 93 at, for example, the first cycle (S18). The master 2 may confirm, by the periodic reference, that the request for the instant task is received based on the fact that a value of the property of the progress status is updated.

When the cloud connector executes the instant task, the cloud connector refers to (acquires) the request parameter of the instant task entity (S15). When a data file necessary for executing the instant task is present in the second storage 94 based on the referred request parameter, the cloud connector downloads the data file from the second storage 94 based on storage destination information (for example, URL) described in the request parameter (S16), and executes the instant task (S15).

When the instant task is completed, the cloud connector updates the corresponding instant task entity in the instant task table (S17). Specifically, the value of the property of the progress status is updated from "in progress" to "completed". Further, a processing result of the instant task is written as the response parameter.

Similar to the cloud connector, the client 3 accesses the first storage 93 of the cloud server 6 at the set polling cycle, and searches for an instant task that is a management relay target (S19). That is, the client 3 determines whether a new entity of an instant task to be executed by the management relay target of the client 3 is registered in the instant task table (S19). Hereinafter, each of one or more management relay targets set as an execution target of an instant task in the instant task table (that is, one or more management relay targets in which the device ID is described in the property of the device ID) is referred to as an "instant task execution target".

When the new instant task entity for the instant task execution target is registered, the client 3 updates a value of the property of the progress status in the instant task entity from "request" to "in progress" (S19). Further, the client 3 refers to (acquires) the request parameter and recognizes processing content to be executed (S19). Furthermore, the client 3 acquires a data file necessary for the execution of the instant task from the second storage 94 as necessary based on the request parameter (S20).

Thereafter, the client 3 instructs the instant task execution target to execute the instant task via the local area network (S21). At this time, the data file necessary for the execution acquired from the second storage 94 is transferred to each instant task execution target (S21). Then, the client 3 acquires an execution result of the instant task from the instant task execution target (S21).

When the execution of the instant task is completed in all of the instant task execution targets, the client 3 updates the instant task entity of the corresponding instant task execution target in the instant task table (S22). Specifically, the value of the property of the progress status is updated from "in progress" to "completed". Further, a processing result of the instant task is written as the response parameter. By the update of the instant task entity, the client 3 notifies the master 2 of an execution progress and a processing result of the instant task in the instant task execution target via the first storage 93 of the cloud server 6 (S22).

As the status confirmation, the master 2 refers to the instant task entity in the instant task table of the first storage 93, confirms that the instant task is completed by notifying that the value of the property of the progress status is updated to "completed", and writes the processing result to the storage unit 15 (S23).

Further, the master 2 may display the processing result on the screen of the display unit 13. When the master 2 confirms that the registered instant task is completed in all of corresponding instant task execution targets, in other words, that the execution instruction of the instant task is no longer necessary (S24), the master 2 deletes the instant task entity of the instant task that is no longer necessary from the first storage 93 (S25). Further, the data file (for example, the firmware update file) in the second storage 94 provided for the corresponding instant task is deleted (S26).

As described above, the management system 1 may remotely control the terminal devices 4 and 5 used in a plurality of bases in one base where the master 2 is installed by registering and updating the instant task entity in the first storage 93 of the cloud server 6 and further transferring the data file via the second storage 94.

(1-4) Effects of Embodiment

In the management system 1 according to the embodiment described above, whether each of the terminal devices 4 and 5 connected to the client 3 via a network is set as the management relay target of the client 3 depends on whether the cloud connector of each of the terminal devices 4 and 5 connected to the network is enabled (S170). That is, when the cloud connector is disabled, the terminal device is set as the management relay target, and when the cloud connector is enabled, the terminal device is not set as the management relay target. Therefore, the client 3 may appropriately manage the terminal devices 4 and 5 in accordance with a managed capability of each of the terminal devices 4 and 5.

In the present embodiment, the terminal device is not uniformly excluded from the management relay target only because the cloud connector is enabled. Even when the cloud connector is enabled, in a case where the cloud connector is in a state in which the cloud connector cannot actually access the cloud server 6 (S180: NO), the client 3 of the present embodiment sets a corresponding terminal device as a management relay target. Therefore, the client 3 may appropriately manage the second type terminal device 5 having the cloud connector that is brought into a state in which the cloud connector cannot access the cloud server 6, in a similar manner to the first type terminal device 4.

Further, before determining whether the cloud connector is enabled, it is determined whether the cloud connector is originally provided (S150) in the present embodiment. When no cloud connector is provided, a corresponding terminal device is set as a management relay target. Therefore, it is possible to efficiently determine whether to set a terminal device as a management relay target.

In the present embodiment, the client 3 corresponds to an example of an information processing device in the present disclosure. The controller 31 of the client 3 corresponds to an example of a computer in the present disclosure. The sub-management program 35a corresponds to an example of a management program in the present disclosure. The cloud server 6 corresponds to an example of a cloud storage in the present disclosure. The cloud connector provided in the second type terminal device 5 corresponds to an example of a cloud access function in the present disclosure. The log information and the status information correspond to an example of terminal data in the present disclosure. The scheduled task, the instant task, and the processing in S210 correspond to an example of a management processing in the present disclosure. Setting an SAS in the second type terminal device 5 corresponds to an example of connection setting in the present disclosure.

The processing in S110 in FIG. 7 corresponds to an example of a search processing in the present disclosure. The processing in S150 corresponds to an example of a function determination processing in the present disclosure. The processing in S160 corresponds to an example of a target setting processing in the present disclosure. The processing in S170 corresponds to an example of an enabling determination processing in the present disclosure. The processing in S180 corresponds to an example of a confirmation processing in the present disclosure. The processing in S220 corresponds to an example of a display processing in the present disclosure.

2. Other Embodiments

Although an embodiment of the present disclosure has been described above, the present disclosure is not limited to the embodiment described above and may be implemented in various modifications.

(2-1) In the periodic search task processing in FIG. 7, the order of S170 and S180 may be reversed. In addition, the processing in S170 or S180 may be omitted. For example, when it is determined in S170 that the cloud connector is enabled, the cloud connector may be excluded from the management relay target in S190 without considering S180. Conversely, S170 may be omitted. When it is determined in S150 that there is a cloud connector, the processing may proceed to S180.

(2-2) The processing in S220 in the periodic search task processing in FIG. 7 may not necessarily be executed at this timing. The processing in S220 may not be included in the periodic search task processing, and may be executed, for example, in response to a user operation that is for requesting a screen display and executed via the input unit 34.

The processing in S220 may also be executed by the master 2. The master 2 may execute the same processing as the processing in S220 by reading the target setting information written into the cloud server 6 in S110.

(2-3) In the instant task table shown in FIG. 5B, the request parameter and the response parameter may be integrated as one common property. That is, when an instant task is instructed from the master 2, the processing content of the instant task may be described in a predetermined task description property, and when the instant task is executed by the client 3, an execution result of the instant task may be overwritten on the same task description property.

(2-4) The first storage 93 is not limited to a NoSQL data store. The first storage 93 may be an SQL database such as a relational database.

(2-5) The management system 1 may include any number of bases. The client 3 may be installed in each of one or more bases among the plurality of bases. In a base where the client 3 is installed, any number of the first type terminal devices 4 and any number of the second type terminal devices 5 may be installed, or one of the first type terminal devices 4 and the second type terminal devices 5 may not be installed.

(2-6) A plurality of functions of one constituent element in the embodiment described above may be implemented by a plurality of constituent elements, or one function of one constituent element may be implemented by a plurality of constituent elements. A plurality of functions of a plurality of components may be implemented by one constituent element, or one function to be implemented by a plurality of constituent elements may be implemented by one constituent element. A part of the configurations in the embodiment described above may be omitted. At least a part of the configurations in the embodiment described above may be added to or replaced with configurations of another embodiment.

What is claimed is:

1. A non-transitory computer readable medium storing management program executable by a computer provided in an information processing device, the information processing device being configured to access a cloud storage and is configured to communicate with a terminal device, the terminal device being configured to have a cloud access function of accessing the cloud storage, and the terminal device which has the cloud access function being capable of enable or disable the cloud access function, wherein the management program causes the computer to execute a process comprising:

acquiring setting information from the terminal device, the setting information relating to setting of the terminal device and indicating whether the cloud access function is set to be enabled;

determining whether the cloud access function is enabled in the terminal device based on the setting information acquired from the terminal device;

setting the terminal device as a management target in a case where it is determined that the cloud access function is not enabled in the determining; and performing at least one of:

acquiring terminal data that is included in the management target from the management target and writing the acquired terminal data into the cloud storage, or reading processing request data that is written into the cloud storage and indicates a processing to be executed by the management target from the cloud storage and causing the management target to execute the processing indicated by the processing request data.

2. The non-transitory computer readable medium according to claim 1, wherein the terminal device is configured to access the cloud storage by the cloud access function in a case where the cloud access function is enabled and a connection setting necessary for accessing the cloud storage is done, the process further comprises confirming whether the connection setting is done in the terminal device in a case where it is determined that the cloud access function is enabled in the determining, the setting of the terminal device includes setting the terminal device as the management target in a case where it is determined that the connection setting is not done in the confirming.

3. The non-transitory computer readable medium according to claim 1, wherein the process further comprises determining whether the terminal device has the cloud access function, and the setting of the terminal device includes setting the terminal device as the management target in a case where it is determined that the terminal device does not have the cloud access function in the determining of whether the terminal device has the cloud access function.

4. The non-transitory computer readable medium according to claim 1, wherein the process further comprises searching a device configured to communicate with the information processing device, and the determining of whether the cloud access function is enabled in the terminal device is executed in a case where the terminal device is searched in the searching.

5. The non-transitory computer readable medium according to claim 4, wherein the performing includes writing, to the cloud storage, information that relates to a device searched in the searching and indicates whether the device is set as the management target.

6. The non-transitory computer readable medium according to claim 1, wherein the information processing device includes a display unit, the process further comprises displaying, on the display unit, information that identifies whether the terminal device is set as the management target.

7. An information processing device comprising:

a controller; and a communication unit configured to communicate with a cloud storage and a terminal device, wherein the terminal device is configured to have a cloud access function of accessing the cloud storage, and the terminal device which has the cloud access function is capable of setting the cloud access function into one of enabled or disabled, wherein the controller is configured to execute:

acquiring setting information from the terminal device, the setting information relating to setting of the terminal device and indicating whether the cloud access function is set to be enabled;

determining whether the cloud access function is enabled in the terminal device based on the setting information acquired from the terminal device;

setting the terminal device as a management target in a case where it is determined that the cloud access function is not enabled in the determining; and performing at least one of:

acquiring terminal data that is data included in the management target from the management target and writing the acquired terminal data into the cloud storage, or reading processing request data that is written into the cloud storage and indicates a processing to be executed by the management target from the cloud storage and causing the management target to execute the processing indicated by the processing request data.

8. A management method to be used in an information processing device, the information processing device being configured to access a cloud storage and is configured to communicate with a terminal device, the terminal device being configured to have a cloud access function of accessing the cloud storage, and the terminal device which has the cloud access function being capable offsetting the cloud access function into one of enabled or disabled, the management method comprising:

acquiring setting information from the terminal device, the setting information relating to setting of the terminal device and indicating whether the cloud access function is set to be enabled;

determining whether the cloud access function is enabled in the terminal device based on the setting information acquired from the terminal device;

setting the terminal device as a management target in a case where it is determined that the cloud access function is not enabled in the determining; and performing at least one of:

acquiring terminal data that is included in the management target from the management target and writing the acquired terminal data into the cloud storage, or reading processing request data that is written into the cloud storage and indicates a processing to be executed by the management target from the cloud storage and causing the management target to execute the processing indicated by the processing request data.

\* \* \* \* \*